(12) United States Patent
Flood

(10) Patent No.: US 11,780,778 B2
(45) Date of Patent: Oct. 10, 2023

(54) USE OF DIAMONDENE FRAGMENTS IN MAKING POLYCRYSTALLINE DIAMOND CUTTERS AND POLYCRYSTALLINE DIAMOND CUTTERS CONTAINING DIAMONDENE FRAGMENTS

(71) Applicant: DIAMOND INNOVATIONS, INC., Worthington, OH (US)

(72) Inventor: Gary Flood, Canal Winchester, OH (US)

(73) Assignee: DIAMOND INNOVATIONS, INC., Worthington, OH (US)

(*) Notice: Subject to any disclaimer, the term of this patent is extended or adjusted under 35 U.S.C. 154(b) by 493 days.

(21) Appl. No.: 17/254,219

(22) PCT Filed: Jun. 28, 2018

(86) PCT No.: PCT/US2018/040068
§ 371 (c)(1),
(2) Date: Dec. 18, 2020

(87) PCT Pub. No.: WO2020/005261
PCT Pub. Date: Jan. 2, 2020

(65) Prior Publication Data
US 2021/0261466 A1 Aug. 26, 2021

(51) Int. Cl.
C04B 35/528 (2006.01)
B24D 18/00 (2006.01)
C04B 35/645 (2006.01)
C04B 35/622 (2006.01)

(52) U.S. Cl.
CPC ............ *C04B 35/528* (2013.01); *B24D 18/00* (2013.01); *C04B 35/62222* (2013.01); *C04B 35/645* (2013.01); *C04B 2235/427* (2013.01); *C04B 2235/612* (2013.01)

(58) Field of Classification Search
None
See application file for complete search history.

(56) References Cited

U.S. PATENT DOCUMENTS

2018/0021924 A1* 1/2018 Wang ................. B24D 18/0009
51/307

FOREIGN PATENT DOCUMENTS

CN 105253883 A * 1/2016
CN 105838930 A * 8/2016

OTHER PUBLICATIONS

Luiz Gustavo Pimenta Martins et al. "Raman evidence for pressure-induced formation of diamondene" Nature Communications 8:96 (Jul. 21, 2017) pp. 1-8 (Year: 2017).*

(Continued)

*Primary Examiner* — Pegah Parvini
*Assistant Examiner* — Ross J Christie

(57) ABSTRACT

Provided is a polycrystalline diamond cutter with a substrate and a diamond body in which the diamond body includes bonded diamond particles and discernable diamondene fragments. The polycrystalline diamond cutter is manufactured by a high pressure high temperature method that includes sintering a diamond feed layer in which the diamond feed layer includes diamond particles and diamondene fragments.

20 Claims, 6 Drawing Sheets

(56) References Cited

OTHER PUBLICATIONS

Shi Jiao et al., "Thermal and tensile properties of diamondene at finite temperature: A molecular dynamics study", Materials & Design, Elsevier, Amsterdam, NL, vol. 156, Jun. 27, 2018, pp. 125-134.
Luiz Gustavo Pimenta Martins et al., "Raman evidence for pressure-induced formation of diamondene", Nature Communications, vol. 8, No. 1, Jul. 21, 2017.

* cited by examiner

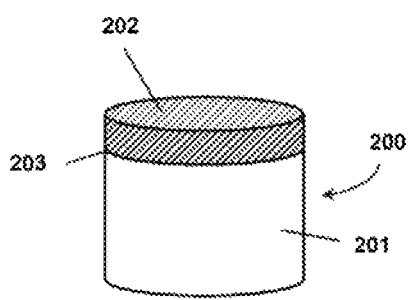 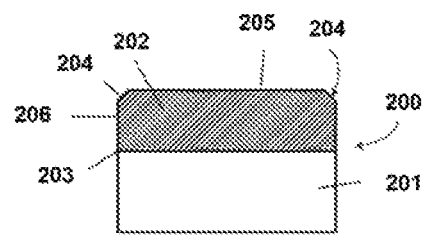
FIG. 2A
PRIOR ART
FIG. 2B
PRIOR ART

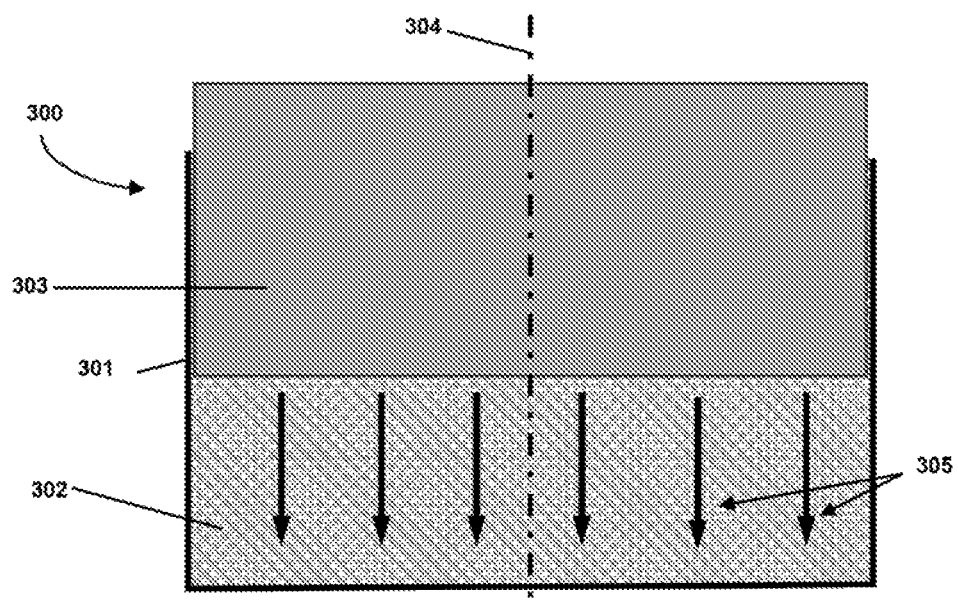
FIG.
3A

USE OF DIAMONDENE FRAGMENTS IN MAKING POLYCRYSTALLINE DIAMOND CUTTERS AND POLYCRYSTALLINE DIAMOND CUTTERS CONTAINING DIAMONDENE FRAGMENTS

This is a National Phase Application filed under 35 U.S.C. 371 as the national stage of PCT/US2018/040068, filed on Jun. 28, 2018, the entire content of which is hereby incorporated by reference in its entirety.

TECHNICAL FIELD AND INDUSTRIAL APPLICABILITY

The present disclosure relates generally to polycrystalline diamond cutters and methods of making thereof. Specifically, the present disclosure relates to methods of using diamondene fragments in making polycrystalline diamond cutters, and to polycrystalline diamond cutters including diamondene fragments.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Tools used in the drilling industry, such as drag bit 100 shown in FIG. 1, often incorporate multiple polycrystalline diamond cutters 200 arranged along a peripheral region of a fin or blade 101 of the drag bit 100. A conventional cylindrical shaped polycrystalline diamond cutter 200 is shown in a schematic, perspective view in FIG. 2A and in a side, cross-sectional view in FIG. 2B. The cutter 200 includes an optional substrate 201, which is made of hard metal, alloy, or composite, and most typically of cemented carbide or cobalt sintered tungsten carbide (WC—Co); and a polycrystalline diamond composite volume 202, also called a diamond table or diamond body, attached or joined coherently to the substrate along an interface 203.

Polycrystalline diamond cutters are commonly made using a high pressure and high temperature (HPHT) manufacturing process. In the HPHT manufacturing process, a mass of diamond particles is placed into a refractory metal container and a cemented carbide substrate is placed in the container such that a surface of the substrate is adjacent to, if not in contact with, the mass of diamond particles. One or both of the diamond mass and the substrate may contain sintering promoting materials, such as a suitable binder material, additive, or catalyst that promotes sintering of the diamond mass and coherent attachment of the sintered diamond mass to the substrate. When a substrate is present, the binder material of the substrate can act as a catalyst in the diamond powders. Optionally, a catalyst can also be added as a powder or foil adjacent to the diamond particles, between the substrate and the diamond particles and this catalyst can also promote sintering. An example of a sintering promoting material is cobalt. The refractory metal container, including the diamond particles and the substrate, form an assembly.

The assembly is then subjected to HPHT conditions. Conventional HPHT conditions include pressures at or above about 4-5 GPa, and temperatures at or above about 1200° C. Typically, under the HPHT processing conditions, the sintering promoting materials melt and sweep through the mass of diamond. In the presence of the sintering promoting materials, diamond particles are bonded to each other in diamond-to-diamond bonds by a dissolution-precipitation process to form a sintered compact in which a polycrystalline diamond mass, i.e., a diamond table, is formed, and which is attached to the substrate (if present). The presence of the sintering promoting materials facilitates formation of diamond-to-diamond bonds and, where applicable, the attachment of the diamond table to the substrate.

When present in the substrate, e.g., as the binder in the substrate, the sintering promoting material typically melts and propagates into the mass of diamond particles. Generally, the binder material of the substrate is selected to function as a catalyst for melting and sintering the diamond particles. That is, in existing processes for forming a polycrystalline diamond cutter, the cobalt or other binder material from the substrate will melt under HPHT conditions and "sweep" from the carbide substrate, into and across the diamond powder to create the polycrystalline diamond cutter. The sweep propagates as a front that moves from an interface between the substrate and the diamond particles toward a distal surface of the diamond. With reference to FIG. 2B, the front moves from the interface 203, though the body of the polycrystalline diamond composite volume 202, and toward the top surface 205. In the presence of the liquefied binder material, diamond particles bond to each other by a dissolution-precipitation process to form a polycrystalline diamond mass attached to the cemented carbide substrate.

Upon sintering, the sintering promoting material (such as a catalyst), or chemically distinct residues thereof, remain in the diamond table, and its presence can have various effects on the polycrystalline diamond's overall performance when used in cutting and machining applications. In particular, the nonuniform distribution of the catalyst or related residues can have detrimental effects on the mechanical properties of the polycrystalline diamond cutter when used in intended applications, such as drilling geologic formations. A nonuniform distribution of the catalyst in the diamond body may, for example, be the result of a sweep that did not reach all the regions of the diamond feed layer, resulting in a diamond body including incompletely joined diamond particles or gaps between the diamond particles. A nonuniform or incomplete distribution of the catalyst in the diamond body may also be the result of using diamond particles of various sizes, resulting in interstitial spaces of various sizes and random distribution. Detrimental effects include, for example, a less than average useable lifetime for the polycrystalline diamond cutter as reflected in a faster than average wear, or a higher than average propensity for fracturing of the diamond body.

The polycrystalline diamond cutter 200 may subsequently be machined into a desired shape, including machining to specified outer diameter, height, and/or the addition of various chamfers or beveled surfaces. Examples of chamfers or beveled surfaces 204 can be seen in side view in FIG. 2B, along with other surfaces of the polycrystalline diamond cutter 200, such as the top surface 205, and side surface 206. The working surface or surfaces of the polycrystalline diamond cutter 200 can be any and all portions of the top surface 205, beveled surface 204, and side surface 206, i.e., any surface of the polycrystalline diamond cutter 200 that contacts the geological formation being drilled.

SUMMARY

A method of using diamondene fragments in making polycrystalline diamond cutters is disclosed. In some embodiments, the methods include forming an assembly including a refractory container, a diamond feed layer, and a substrate; and processing the assembly under high pressure high temperature sintering conditions (HPHT) from 4 GPa to 8 GPa, and from 1200° C. to 1700° C., to sinter the diamond feed into a diamond body affixed to the substrate; wherein the diamond feed layer comprises diamond particles and diamondene fragments. In some embodiments, the wt. % of diamondene fragments in the diamond feed layer is between 0.001 wt. % and 10 wt. %. In some embodiments, the wt. % of diamondene fragments in the diamond feed layer is between 0.05 wt. % and 10 wt. %. In some embodiments, the wt. % of diamondene fragments in the diamond feed layer is between 0.01 wt. % and 5 wt. %. In some embodiments, the wt. % of diamondene fragments in the diamond feed layer is between 0.1 wt. % and 1 wt. %. In some embodiments, the diamond feed layer and/or the substrate includes a catalyst material. In some embodiments, the disclosed methods include further steps, for example leaching a portion of the sintered diamond body, and/or finish machining the diamond body.

Polycrystalline diamond cutters are also disclosed, the cutters including a diamond body having one or more working surfaces, and a substrate, the diamond body including bonded diamond particles and bonded diamondene fragments. In some embodiments, the volume fraction of discernable diamondene fragments in the diamond body is between 0.0005 vol. % and 5 vol. %. In some embodiments, the volume fraction of discernable diamondene fragments in the diamond body is up to 5 vol. %. In some embodiments, the volume fraction of discernable diamondene fragments in the diamond body is about 5 vol. %.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIG. 2A shows a schematic perspective view of a conventional cylindrical shaped polycrystalline diamond cutter, and FIG. 2B shows a conventional cylindrical shaped polycrystalline diamond cutter in cross-sectional view, including optional chamfers or beveled surfaces at an edge of the diamond table.

FIG. 3A shows a cross-sectional view of an assembly used in a disclosed method of making a polycrystalline diamond cutter, the assembly including a refractory container, a diamond feed layer, and a substrate, the diamond feed layer including diamondene fragments.

DETAILED DESCRIPTION

Figure 1:
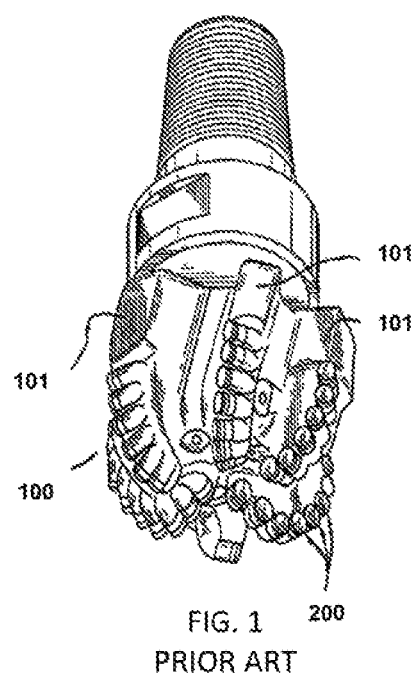
FIG. 1 shows an example of a tool used in the drilling industry, in this case a conventional drag bit.

The disclosure relates to methods of using diamondene fragments in making polycrystalline diamond cutters as described herein. In general, methods of manufacture include forming an assembly for subsequent high pressure-high temperature (HPHT) processing during which polycrystalline diamond particles and diamondene fragments, with the aid of a sintering promoting material, such as a catalyst, are consolidated and sintered into a diamond body that is bonded to the substrate. As described herein, in some embodiments, the disclosed methods result in sintered diamond bodies including diamondene fragments, while in other embodiments, the disclosed methods result in sintered diamond bodies not including discernable diamondene fragments.

An assembly can be formed in one of several ways. For example, and as shown in FIG. 3A, an assembly 300 can be formed along an axis of symmetry 304. A layer of diamond feed 302 is placed in a refractory container 301. Layer 302 can be formed by pouring or otherwise adding the diamond feed into the interior volume of the refractory container 301. The diamond feed 302 is distributed in a layer on the bottom of the refractory container 301 and has a desired distribution and thickness. In some embodiments, the diamond feed 302 is distributed in a variable thickness layer of between 1 mm and 5 mm. A carbide or other suitable substrate 303 is thereafter placed on the diamond feed layer 302.

The refractory container 301 is typically made from a refractory alloy including one or more metals such as tantalum (Ta), niobium (Nb), molybdenum (Mo), and/or zirconium (Zr). In some embodiments, tantalum is a preferred material. The refractory container 301 can be made by any suitable method. In some embodiments, the refractory container 301 is seamless and is formed by a sheet metal forming process that includes a drawing operation, for example deep drawing.

The substrate 303 described herein can be any suitable substrate that can be processed in the high pressure-high temperature sintering environment used to consolidate and sinter the polycrystalline diamond particles and/or diamondene fragments into the diamond body, and to bond the diamond body to the substrate. For example, the composition of the substrate typically includes a catalyst. In exemplary embodiments, the substrate is a hard metal alloy or composite, a cemented carbide, or cobalt sintered tungsten carbide (WC—Co). In some embodiments, the substrate is or includes cobalt sintered tungsten carbide and has a composition of 8-15 wt. % cobalt and 85-92 wt. % tungsten carbide and, optionally, 0.1-2.5 wt. % chromium.

In general, the substrate can be manufactured to final shape or near final shape prior to use in the high pressure-high temperature manufacturing operation. For example, the substrate can be formed substantially in the shape of a solid body, such as any type of cylinder or any type of polyhedron. Powder metallurgy techniques can be used to form a green body with near net shape geometry and then the substrate can be machined to final form before being processed in the high pressure-high temperature sintering environment used to consolidate and sinter the polycrystalline diamond particles and/or diamondene fragments into the diamond body, and to bond the diamond body to the substrate.

As described herein, the diamond feed layer 302 includes both diamond particles and diamondene fragments. Diamondene is a form of diamond (see for example Martins et al., Nature Communications, vol. 8, article number: 96 (2017), doi:10.1038/s41467-017-00149-8). Without wishing to be bound by any particular theory, it is believed that diamondene is a form of diamond having two dimensions measurable on a macroscopic scale, and a third dimension limited to one or more atomic layers. In some embodiments, diamondene can include one layer of $sp^3$ carbon (C) atoms. In some embodiments, diamondene can include two layers of $sp^3$ carbon atoms. In some embodiments, diamondene can include three layers of $sp^3$ carbon atoms. In still other embodiments, diamondene can include more than one, more than two, or more than three layers of $sp^3$ carbon atoms. In some embodiments, diamondene can include atoms other than carbon atoms, for example oxygen atoms (O) and/or hydrogen atoms (H). In some embodiments, diamondene can include groups including atoms other than carbon atoms, for example OH groups.

The wt. % of diamondene fragments in the diamond feed layer can vary, as long as the amount of diamondene fragments does not interfere with the bonding of the diamond particles under subsequent HPHT processing. Without wishing to be bound by any particular theory, it is believed that, in some embodiments, by adding diamondene fragments to the diamond feed layer, the bonding between the diamond particles can be improved compared to that present in a diamond feed layer without diamondene fragments. Without wishing to be bound by any particular theory, it is believed that the diamondene fragments can act as a sintering aid material between the diamond particles in the packing of the diamond feed layer. In some embodiments, diamondene fragments are added up to an upper limit. In some embodiments, the upper limit is the maximum amount of diamondene fragments which still allows for a crushing of the diamond particles during subsequent HPHT processing. In some embodiments, the upper limit is the maximum amount of diamondene fragments which still allows for sufficient open spaces between the diamond particles for the catalyst sweep-thorough described herein. In some embodiments, the inclusion of diamondene fragments in the diamond feed layer improves the alignment of the diamond particles comparative with the alignment of diamond particles in a diamond feed layer not including diamondene fragments In some embodiments, the wt. % of diamondene fragments in the diamond feed layer can have a lower limit of 0.001 wt. %. In some embodiments, the wt. % of diamondene fragments in the diamond feed layer can have a lower limit of 0.01 wt. %. In some embodiments, the wt. % of diamondene fragments in the diamond feed layer can have a lower limit of 0.1 wt. %. In some embodiments, the wt. % of diamondene fragments in the diamond feed layer can have an upper limit of 10 wt. %. In some embodiments, the wt. % of diamondene fragments in the diamond feed layer can have an upper limit of 5 wt. %. In some embodiments, the wt. % of diamondene fragments in the diamond feed layer can have an upper limit of 1 wt. %. The wt. % of the diamondene fragments is by wt. % of the diamond feed layer.

In still other embodiments, the wt. % of diamondene fragments in the diamond feed layer can have a lower limit of 0.05 wt. % of the diamond feed layer. Other amounts of diamondene fragments will depend on the diamond crystal size distribution in the diamond layer and on the intended application, with the wt. % of diamondene fragments in the diamond feed layer having an upper limit of about 10%.

Diamond particles used herein can have any suitable size, as measured by average diameter. In some embodiments, the diamond particles can have a narrow distribution of average diameters, while in other embodiments the diamond particles can have a wider distribution of average diameters. Furthermore, the diamond particle size distribution can be mono-modal or bi-modal or multi-modal, or a continuous skewed distribution. In some embodiments, the diamond particles used include coarse diamond particles. For example, in some embodiments, the coarse diamond particles used include diamond particles with an average diameter between 30 µm and 150 µm. In some embodiments, the diamond particles used include fine diamond particles. For example, in some embodiments, the fine diamond particles used include diamond particles with an average diameter between 0.2 µm and 3 µm. In still other embodiments, the diamond particles include diamond particles having an average diameter between fine diamond particles and coarse diamond particles. For example, such diamond particles have an average diameter between 3 µm and 30 µm.

In some embodiments, assemblies can include solid catalyst, such as a foil or metal disc, placed at the bottom of the substrate opposite the diamond feed layer-substrate interface. A typical catalyst solid is a cobalt or cobalt alloy metal disc. The metal body is in direct contact with a portion of the diamond feed, and during the HPHT processing melts and sweeps along an axis of the assembly through the diamond feed layer. This typically occurs prior to the binder sweep from the substrate. The infiltration of catalyst metal from two sources—binder in the substrate and catalyst in foil or disc—contributes to attachment of the diamond body to the substrate. The catalyst solid can be incorporated into any of the assemblies disclosed herein.

An assembly as described herein can be sealed prior to the HPHT process. Sealing can be by any suitable means that secures the components and contents in the refractory container. For example, portions of the ends of the cup can be crimped over the substrate surface. Also for example, a cap, typically of the same material as the refractory container, can optionally be placed over the formed assembly, to cover the contents of the refractory container before sealing. Thus, portions of the container itself (or the container and the cap, if present) can be crimped or otherwise pressed together so as to seal the components and form an assembly. When used, the cap can be a disc or foil or similar planar structure that is placed over the opening of the container and its content, and then the peripheral edge of the cap and the peripheral edge of the opening of the container are crimped or otherwise pressed together or folded over so as to seal the cap and the container to form a capped assembly. The cap is typically of the same material as the refractory container, e.g., tantalum.

An assembly formed as described herein can be processed under high pressure-high temperature (HPHT) processing conditions. One or more assemblies are loaded into a cell for high pressure-high temperature (HPHT) processing. Generally, the cell includes a gasketing material which transmits pressure and retains the contents of the cell under pressure, a heating element, the assemblies, and insulating materials. An example of a suitable cell is disclosed in U.S. Pat. No. 4,807,402, the entire contents of which are incorporated herein by reference. The cell is then subjected to high pressure-high temperature (HPHT) processing conditions sufficient to consolidate and sinter the diamond feed into a diamond body that is bonded to the substrate. An example of suitable HPHT processing conditions includes pressures in the range of about 5 GPa to about 10 GPa and temperatures in the range of about 1100° C. to about 2000° C. for times up to 20-30 minutes. Conditions favorable for the present methods and structures fall within about 5 GPa to about 8 GPa and about 1300° C. to about 1700° C. for about 12-18 minutes.

Without wishing to be bound by any particular theory, it is believed that during HPHT sintering process, a liquid front sweeps or moves from an interface between the substrate and the diamond particles toward a region of the diamond feed layer distally separated from the interface, for example as shown in FIG. 3A in the general direction depicted by arrows 305, where distally separated means both spatially separated from and at a distance from a reference location. As used herein, a "front" refers to either an amount of molten sintering promoting material, such as molten catalyst material, moving through the diamond feed layer, or to a moving boundary between solid and molten sintering promoting material, such as molten catalyst material.

Figure 3B:
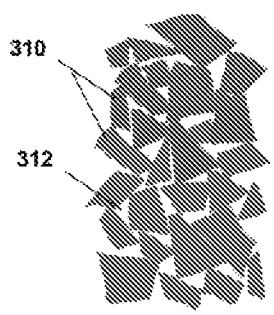
FIGS. 3B-3D are schematic representations of a sweep of molten catalyst material moving through a packed bed of polycrystalline diamond particles.
Figure 3C:
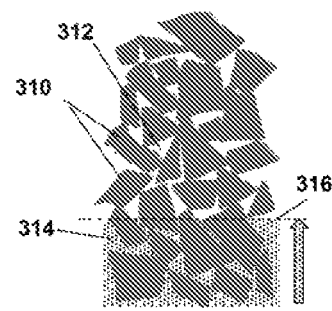
Figure 3D:
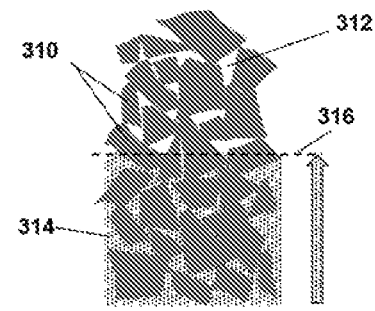
Figure 3E:
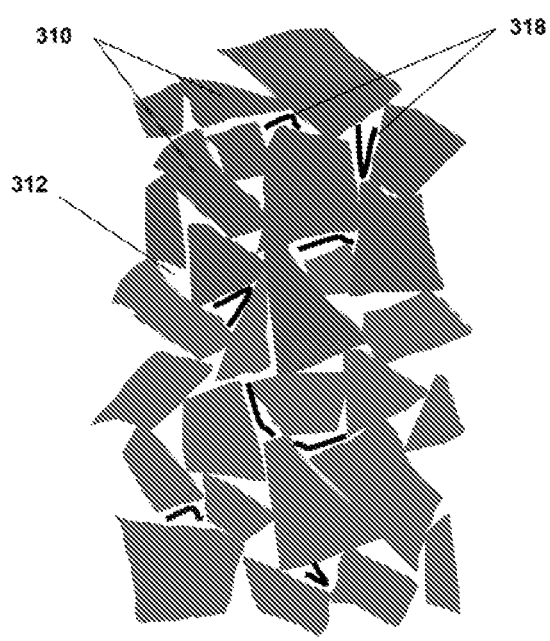
FIG. 3E is a schematic representation of a packed bed of polycrystalline diamond particles and diamondene fragments.

A liquid front sweeps or moves through a packed bed of diamond particles also as shown in FIGS. 3B-3D. As shown in FIG. 3B, prior to any movement of molten sintering promoting material from its source, for example, the binder material in the substrate, the compressed diamond particles 310 are in direct contact with their nearest neighbors as a result of being packed together under high pressure. The packing is not complete because the diamond particles 310 are resistant to total crushing. The pre-sweep condition therefore includes open spaces 312 between the diamond particles 310. Such open spaces 312 are subsequently filled with the molten sintering promoting material 314 as the sweep front 316 passes them (See FIGS. 3C and 3D). In some embodiments, the method described herein includes using diamondene fragments added to the diamond feed layer as described herein. For example, as shown in FIG. 3E, diamondene fragments 318 can be mixed with, and interspersed between diamond fragments 310, occupying the spaces 312 between diamond particles. Without wishing to be bound by any particular theory, it is believed that an upper limit exists such that the pre-sweep open space structure is insufficiently open to permit the liquid sweep of a given sintering promoting material through the packed bed of diamond particles during HPHT processing. It is further believed that examples of amounts of diamondene fragments that can occupy the spaces 312 between diamond particles can be from about 1%, alternatively 5%, alternatively 10%, alternatively 25% of the open spaces 312 to about 30%, alternatively 40%, alternatively 50%, alternatively 75% of the open spaces 312.

Without wishing to be bound by any particular theory, it is believed that, during the HPHT process, the diamondene fragments are bonded to the diamond particles, and to each other, by the formation of diamond-to-diamond bonds. In some embodiments, diamond-to-diamond bonds are formed by a dissolution-precipitation process. In some embodiments, the formation of diamond-to-diamond bonds, including diamond-to-diamond bonds to diamondene fragments, is promoted by sintering promoting materials. In some embodiments, the formation of diamond-to-diamond bonds, including diamond-to-diamond bonds to diamondene fragments, is not promoted by sintering promoting materials, but rather by the properties of the diamondene fragments relating to the thinness of the diamondene fragments. For example, in some embodiments, diamond-to-diamond bonds including diamond-to-diamond bonds to diamondene fragments are formed under HPHT conditions because the thin diamondene fragments are more prone to participate in diamond bond formation processes promoted by the high pressure of the HPHT process, without the need of sintering promoting materials.

Without wishing to be bound by any particular theory, it is believed that, in some embodiments, all or a portion of the diamondene fragments in the diamond feed layer can be separately discernable in the as-sintered diamond body after going through dissolution-precipitation processes, while in other embodiments, none of the diamondene fragments in the diamond feed layer can be separately discernable in the as-sintered diamond body after going through dissolution-precipitation processes. Discernable diamondene fragments may appear as small whisker-like features adjacent to sintered diamond particles as viewed under high magnification, for example using a scanning electron microscope at a magnification of between 1000× and 5000×, on a polished surface of the sintered diamond layer. Or they may appear as tiny islands within residues of the sintering-promoting material as viewed under high magnification, for example using a scanning electron microscope at a magnification of between 1000× and 5000×, on a polished surface of the sintered diamond layer.

The methods described herein can further include finishing steps of the diamond body to final form. Such processing can include finish wire shaping or grinding of the surfaces of the diamond body, lapping or grinding of the diamond body to planarize some portions of the top surface of the diamond body, grinding to add a bevel or chamfer to the diamond body and/or substrate, rotational grinding to finish grind the cylindrical sides of the cutter, and leaching of the catalyst in one or more portions of the diamond body. In some embodiments, the methods include finish machining the diamond body. In some embodiments, finish machining includes one or more of laser cutting, electrical discharge machining, grinding, and polishing.

In some embodiments, the method further includes leaching a portion of the sintered diamond body to form interstitial regions substantially free of catalyst material or sintering residue thereof. Interstitial regions are microstructural features of the sintered diamond body that refers to the spaces within the matrix phase of the sinter bonded polycrystalline diamond material typically occupied by a catalyst material like Co and/or fillers upon formation of the sintered diamond body using HPHT techniques and which form empty spaces, pores or voids as a result of the catalyst material being removed therefrom in, for example, a subsequent leaching step. In some embodiments, the diamond body portion including interstitial regions substantially free of catalyst material or sintering residue thereof extends from a working surface into an interior volume of the diamond body. Removal of catalyst from the diamond body, particularly from portions of the diamond body that act as a working surface of the polycrystalline diamond cutter leaves interconnected network of pores and a residual catalyst (up to 10 vol. %) trapped inside the polycrystalline diamond body. In some embodiments, the removal of catalyst, such as cobalt, from diamond bodies improves abrasion resistance of the diamond body. Such leaching can occur in at least a portion of the diamond body and renders the diamond body in that portion substantially free of catalyst material. Leaching can occur, for example, by chemical etching in acids in which portions to be leached are exposed to an acid or a mixture of acids, such as aqua regia, for a period of time sufficient to dissolve the catalyst material to a depth from the surface of the diamond body. As used herein, aqua regia refers to a mixture of nitric acid and hydrochloric acid, optimally in a molar ratio of 1:3. The time varies by strength of acid, temperature and pressure as well as the desired depth. Exemplary depths from which the catalyst material has been removed range from 50 microns to 800 microns, alternatively less than 300 microns or less than 200 microns or less than 100 microns. Also, for example, the depth may be at least half of the overall thickness of the diamond body, but the depth is no closer to the interface between the lower side of the diamond body and the upper side of the substrate than about 200 microns. Descriptions of leaching and of leached polycrystalline diamond cutters are contained in, for example, U.S. Pat. Nos. 4,224,380; 6,544,308 and 8,852, 546, the entire contents of each are incorporated herein by reference.

Figure 4:
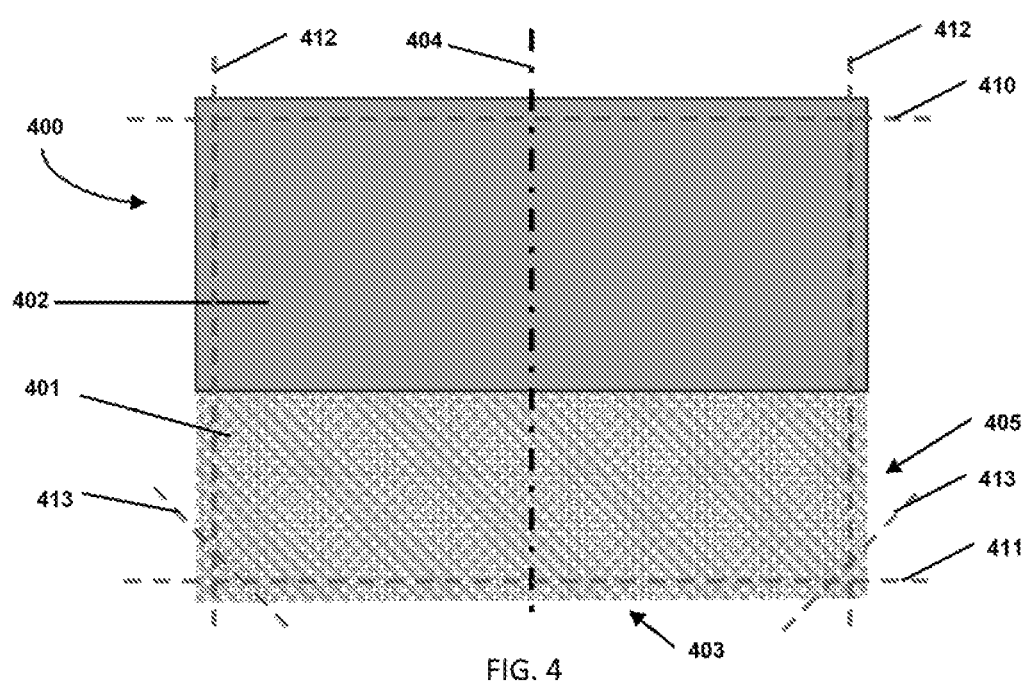
FIG. 4 shows a cross-sectional view of a polycrystalline diamond cutter including a substrate and diamond body described herein. The dotted lines indicate various planar, cylindrical, or conical surfaces along which the as-sintered diamond cutter can be finish machined by, for example, laser cutting, electrical discharge machining, grinding, and/or polishing.

The disclosure also relates to a polycrystalline diamond cutter per se, including a diamond body and an optional substrate, the diamond body having one or more working surfaces. In some embodiments, the diamond body includes a plurality of bonded diamond particles, a plurality of bonded diamondene fragments, and a plurality of interstitial regions. An exemplary polycrystalline diamond cutter 400 is shown in FIG. 4. The cutter includes (along an axis 404) a substrate 402, and a diamond body 401, the diamond body including working surfaces 403 and 405. In some embodiments, the diamond body includes sintered diamond particles and sintered diamondene fragments. As described herein, in some embodiments, at least a portion, but not all of the diamondene fragments in the diamond feed layer subjected to an HPHT method can be separately discernable in the as-sintered diamond body after going through the dissolution-precipitation processes of the HPHT method. In some embodiments, discernable diamondene fragments (as observed and determined using a highly magnified and polished surface as disclosed herein) in the diamond body 401 can be present to an upper limit of about 5 vol. %, in volume percent of discernable diamondene. For example, the volume fraction of discernable diamondene fragments in the diamond body (401) can be between 0.0005 vol. % and 5 vol. %. In another example, the volume fraction of discernable diamondene fragments in the diamond body (401) can be about 5 vol. % (±0.5 vol. %); however, the specific volume fraction of discernable diamondene fragments in the diamond body (401) can vary depending on the application for the diamond body (and any cutter incorporating the diamond body (401)).

The features and geometry of the substrate and the diamond body that form the polycrystalline diamond cutter can vary, and the various embodiments of the polycrystalline diamond cutter can be further processed to final form. Such processing can include finish wire shaping or grinding of the surfaces of the passage, lapping or grinding of the diamond body to planarize the top surface of the body, grinding to add a bevel or chamfer to the diamond body and/or substrate, rotational grinding to finish grind the cylindrical sides of the cutter, and leaching of the catalyst in one or more portions of the diamond body.

In some embodiments, further processing includes machining along various surfaces, including planar, cylindrical, or hyperboloid surfaces. For example, and as shown in FIG. 4 represented by various dashed lines, a diamond cutter 400 including the as-sintered diamond body 401, can be machined to: i) reduce the height of the substrate 402 by machining along plane 410; ii) reduce the overall diameter and/or circumference of the cutter 400 by machining along cylinder 412; iii) reduce the height of the diamond body 401 by machining along plane 411; and/or iv) add chamfered and/or beveled surfaces by machining along the frustum of cone 413. The beveled or chamfered surfaces described herein can have any size. In some embodiments, the beveled or chamfered surface may have a vertical height, i.e., length in the axial direction, of 0.5 mm to about 1 mm and an angle of 45 degrees which may provide a particularly strong and fracture resistant tool component. In some embodiments, the beveled or chamfered surface has a vertical height, i.e., length in the axial direction, which is the same as the thickness, i.e., axial thickness, of the planar oriented portion.

In some embodiments, the diamond bodies described herein include a plurality of bonded diamond particles and a plurality of interstitial regions. In some embodiments, the diamond bodies described herein include a plurality of bonded diamond particles, a plurality of bonded diamondene fragments, and a plurality of interstitial regions. The composition of diamond bodies described herein includes sintered diamond particles sized between about 1 µm to about 100 µm, and a catalyst metal phase between about 6 percent by weight (wt. %) to about 25 percent by weight (wt. %). The diamond bodies are formed integrally to the substrate through a high pressure-high temperature sintering process as described herein during which catalyst diffuses into the diamond body and not only densifies the diamond body, but also serves to mechanically bond the diamond body to the substrate.

In some embodiments, a portion of the interstitial regions include a catalyst material or catalyst material sintering residue. In some embodiments, a portion of the interstitial regions are substantially free of catalyst material or catalyst material sintering residue. In some embodiments, the portion of the diamond body including interstitial regions substantially free of catalyst material or catalyst material sintering residue, extends from the working surface into an interior volume of the diamond body.

Without wishing to be bound by any particular theory, it is believed that by using diamondene in the HPHT processes described herein, and/or by incorporating diamondene fragments in the diamond bodies of polycrystalline diamond cutters, the mechanical performance of the cutters can be improved. Mechanical performance can be measured by any number of methods, including abrasion tests, thermal stability tests, and/or methods of measuring resistance to chipping. In some embodiments, abrasion resistance is measured as $mm^3$ diamond wear vs. $mm^3$ grinded rock. In some embodiments, any measure of mechanical performance described herein, including abrasion resistance, can be improved by at least 50% or more in a polycrystalline diamond cutter including diamondene fragments compared to a polycrystalline diamond cutter not including diamondene fragments. In some embodiments, any measure of mechanical performance described herein, including abrasion resistance, can be improved by at least 50% or more in a polycrystalline diamond cutter made by including diamondene fragments in the pre-sintering diamond feed layer compared to a polycrystalline diamond cutter traditionally made without including diamondene fragments in the diamond feed layer.

The exemplary cutters described and disclosed herein can be incorporated in drilling tools used, for example, in drilling geological formations. Such drilling tools can incorporate flushing media supplied to the drill head to facilitate removing debris from the drilling zone as well as to remove heat from the drill head that is generated in the drilling operation. Examples of drilling tools include drag bits having polycrystalline diamond cutters arranged along a periphery region of a fin or blade.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of making a polycrystalline diamond cutter, the method comprising:
   forming an assembly comprising along an axis of the assembly a refractory container, a diamond feed layer, and a substrate; and
   processing the assembly under high pressure high temperature sintering conditions (HPHT) from 4 GPa to 8 GPa, and from 1200° C. to 1700° C., to sinter the diamond feed into a diamond body affixed to the substrate;
   wherein the diamond feed layer comprises diamond particles and diamondene fragments.

2. The method of claim 1, wherein the wt. % of diamondene fragments in the diamond feed layer is between 0.001 wt. % and 10 wt. %.

3. The method of claim 1, wherein the wt. % of diamondene fragments in the diamond feed layer is between 0.01 wt. % and 5 wt. %.

4. The method of claim 1, wherein the wt. % of diamondene fragments in the diamond feed layer is between 0.1 wt. % and 1 wt. %.

5. The method of claim 1, wherein the diamond feed layer comprises a catalyst material.

6. The method of claim 1, wherein the substrate comprises a catalyst material.

7. The method of claim 1, wherein the diamond body comprises a plurality of bonded diamond particles and a plurality of interstitial regions.

8. The method of claim 7, wherein a portion of the interstitial regions include a catalyst material or catalyst material sintering residue.

9. The method of claim 7, further comprising leaching a portion of the sintered diamond body to form interstitial regions substantially free of catalyst material or catalyst material sintering residue.

10. The method of claim 9, wherein the portion of the sintered diamond body comprising interstitial regions substantially free of catalyst material or sintering residue thereof extends from a working surface into an interior volume of the diamond body.

11. The method of claim 1, further comprising finish machining the diamond body.

12. The method of claim 11, wherein finish machining includes one or more of laser cutting, electrical discharge machining, grinding, and polishing.

13. A polycrystalline diamond cutter comprising a diamond body and a substrate, wherein the diamond body has one or more working surfaces, and wherein the diamond body comprises a plurality of bonded diamond particles, a plurality of bonded diamondene fragments, and a plurality of interstitial regions.

14. The polycrystalline diamond cutter of claim 13, wherein the volume fraction of discernable diamondene fragments in the diamond body is up to 5 vol. %.

15. The polycrystalline diamond cutter of claim 13, wherein the volume fraction of discernable diamondene fragments in the diamond body is about 5 vol. %.

16. The polycrystalline diamond cutter of claim 13, wherein the volume fraction of discernable diamondene fragments in the diamond body is between 0.0005 vol. % and 5 vol. %.

17. The polycrystalline diamond cutter of claim 13, wherein a portion of the interstitial regions include a catalyst material or catalyst material sintering residue.

18. The polycrystalline diamond cutter of claim 13, wherein a portion of the interstitial regions are substantially free of catalyst material or catalyst material sintering residue.

19. The polycrystalline diamond cutter of claim 18, wherein the portion of the diamond body comprising interstitial regions substantially free of catalyst material or catalyst material sintering residue, extends from a working surface into an interior volume of the diamond body.

20. The polycrystalline diamond cutter of any one of claims 13 to 19, wherein a portion of a working surface is beveled or chamfered.

* * * * *